United States Patent
Ben Helal et al.

(10) Patent No.: US 10,148,146 B2
(45) Date of Patent: Dec. 4, 2018

(54) BRUSH-COMMUTATED DIRECT-CURRENT MOTOR

(71) Applicant: Brose Fahrzeugteile GmbH & Co. Kommanditgesellschaft, Wuerzburg, Wuerzburg (DE)

(72) Inventors: Akram Ben Helal, Frankfurt (DE); Walter Roeder, Wuerzburg (DE); Norbert Heim, Rottendorf (DE); Johannes Bartoschek, Gerbrunn (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 115 days.

(21) Appl. No.: 15/501,293

(22) PCT Filed: Aug. 12, 2015

(86) PCT No.: PCT/EP2015/068509
§ 371 (c)(1),
(2) Date: Feb. 2, 2017

(87) PCT Pub. No.: WO2016/023930
PCT Pub. Date: Feb. 18, 2016

(65) Prior Publication Data
US 2017/0222509 A1    Aug. 3, 2017

(30) Foreign Application Priority Data
Aug. 12, 2014    (DE) ..................... 10 2014 215 974

(51) Int. Cl.
*H02K 23/00*    (2006.01)
*H02K 3/28*    (2006.01)
(Continued)

(52) U.S. Cl.
CPC ............... *H02K 3/28* (2013.01); *H02K 1/265* (2013.01); *H02K 13/04* (2013.01); *H02K 23/34* (2013.01)

(58) Field of Classification Search
CPC ........... H02K 3/28; H02K 1/165; H02K 13/04
(Continued)

(56) References Cited

U.S. PATENT DOCUMENTS 6,822,365 B2 * 11/2004 Mori ..................... H02K 23/30
                                                             310/198
6,888,280 B2 *  5/2005 Dube ..................... H02K 3/28
                                                             310/177
(Continued)

FOREIGN PATENT DOCUMENTS

CN    101378214          3/2009
CN    101953057 A        1/2011
(Continued)

OTHER PUBLICATIONS

CN Office action dated Jun. 28, 2018 issued in corresponding CN Application No. 201580043130.6, 5 pages, with English translation, 1 page.

*Primary Examiner* — Hanh Nguyen
(74) *Attorney, Agent, or Firm* — Lewis Roca Rothgerber Christie LLP

(57) ABSTRACT

A brush-commutated direct-current motor comprises a stator which includes a plurality of exciter poles, a rotor rotatable relative to the stator about an axis of rotation, a plurality of pole teeth arranged on the rotor, and grooves arranged between the pole teeth, wherein the pole teeth are separated from each other by the grooves along a circumferential direction around the axis of rotation. On the pole teeth coil windings are arranged. A commutator is arranged on the rotor and includes a plurality of lamellae, wherein each coil winding is connected with one of the lamellae via a first (Continued)

connecting arm and is connected with another one of the lamellae via a second connecting arm.

18 Claims, 10 Drawing Sheets

(51) Int. Cl.
 *H02K 23/34* (2006.01)
 *H02K 1/26* (2006.01)
 *H02K 13/04* (2006.01)
(58) Field of Classification Search
 USPC ....... 310/177, 231, 232, 233, 234, 127, 128, 310/143, 151
 See application file for complete search history.

(56) References Cited

U.S. PATENT DOCUMENTS

| | | | |
|---|---|---|---|
| 7,560,848 B2 | 7/2009 | Roos et al. | |
| 7,619,344 B2 | 11/2009 | Osawa et al. | |
| 7,821,170 B2 | 10/2010 | Qin et al. | |
| 8,698,370 B2 | 4/2014 | Roos | |
| 2007/0257572 A1* | 11/2007 | Nakano | H02K 1/24 310/68 D |
| 2008/0093943 A1* | 4/2008 | Roos | H02K 23/30 310/154.45 |
| 2008/0122303 A1* | 5/2008 | Santo | H02K 5/148 310/51 |
| 2009/0309451 A1* | 12/2009 | Roos | H02K 23/30 310/179 |
| 2011/0241475 A1* | 10/2011 | Kirchner | H02K 3/28 310/234 |
| 2013/0193795 A1 | 8/2013 | Kojima et al. | |
| 2015/0318769 A1 | 11/2015 | Hashizume et al. | |

FOREIGN PATENT DOCUMENTS

| | | |
|---|---|---|
| CN | 103095082 A | 5/2013 |
| CN | 203674943 U | 6/2014 |
| DE | 103 61 811 A1 | 7/2005 |
| DE | 10 2008 000 377 A1 | 8/2009 |
| EP | 1 489 724 B1 | 9/2008 |
| FR | 2 841 399 | 12/2003 |
| JP | 2010110111 A | 5/2010 |

* cited by examiner

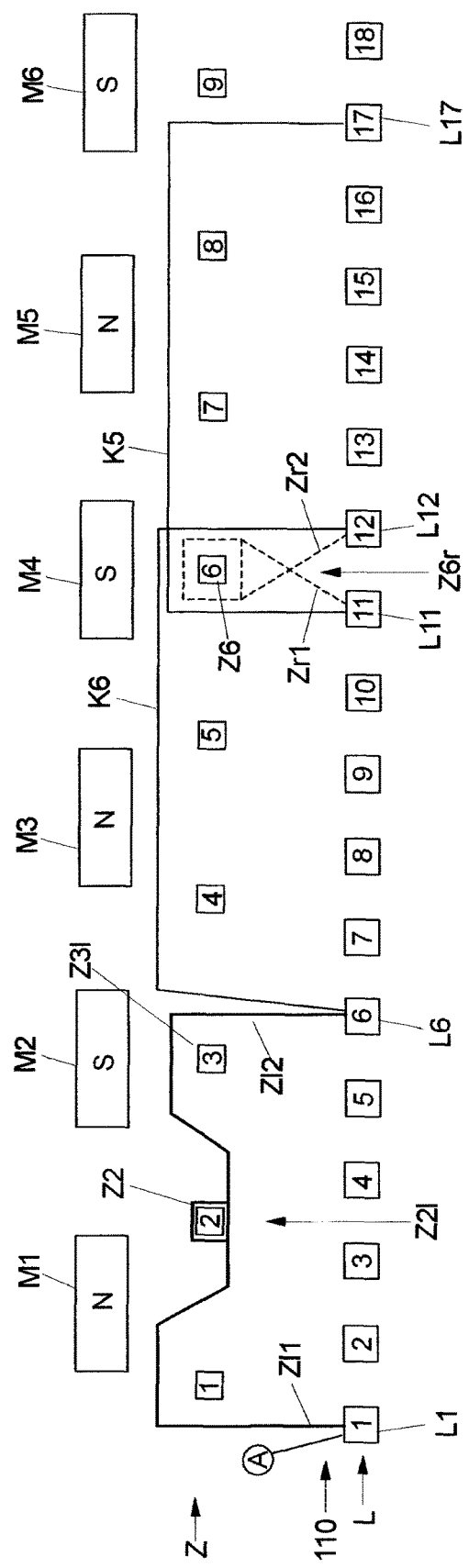

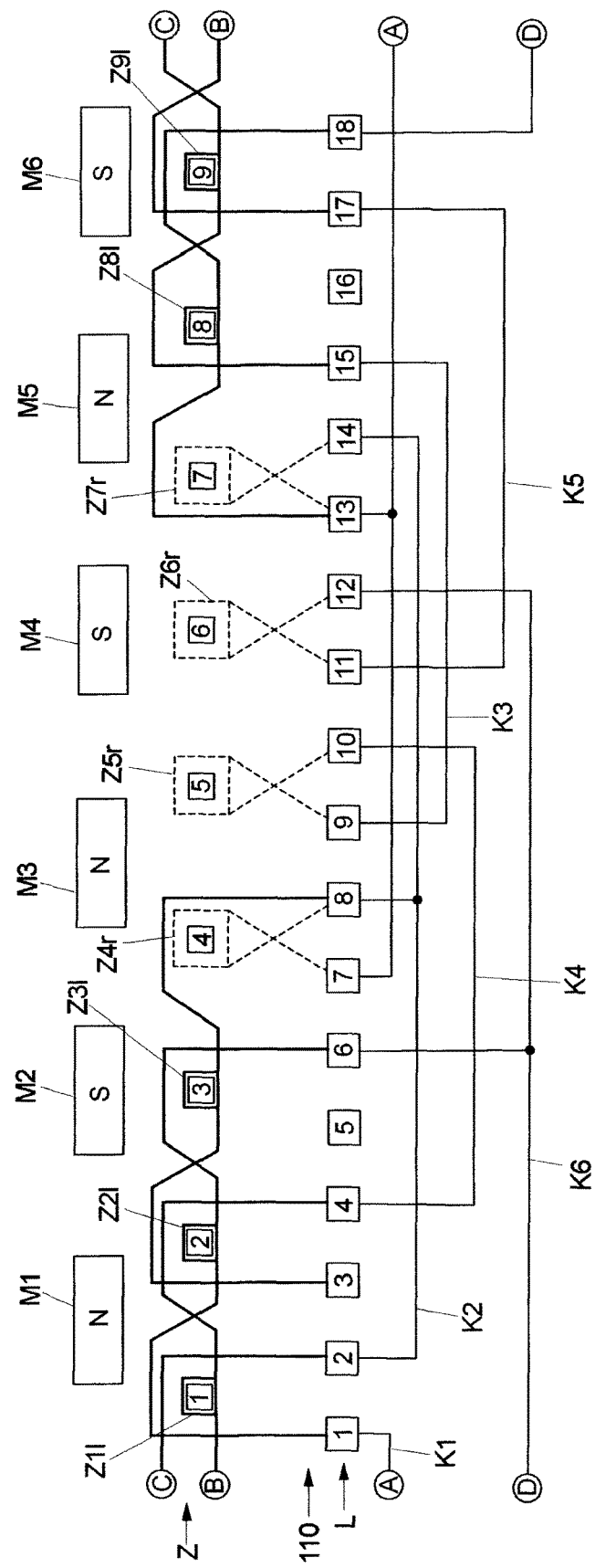

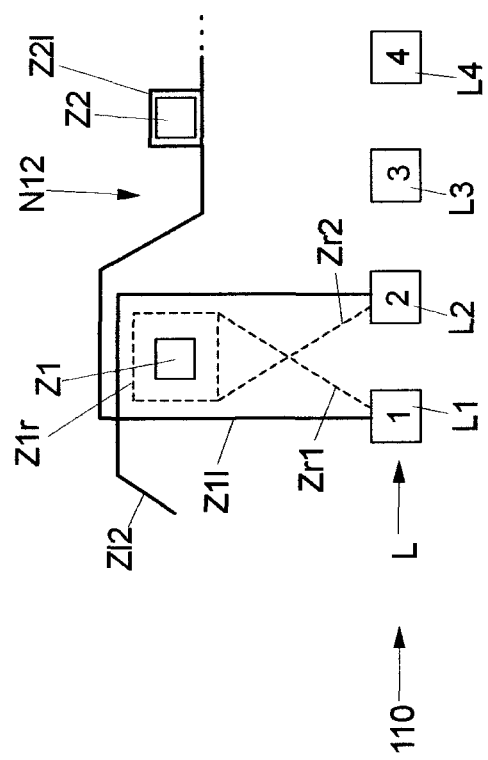

BRUSH-COMMUTATED DIRECT-CURRENT MOTOR

CROSS-REFERENCE TO A RELATED APPLICATION

This application is a National Phase Patent Application of International Patent Application Number PCT/EP2015/068509, filed on Aug. 12, 2015, which claims priority of German Patent Application Number 10 2014 215 974.1, filed on Aug. 12, 2014. The entire contents of both of which are incorporated herein by reference.

BACKGROUND

This invention relates to a brush-commutated direct-current motor.

Such brush-commutated direct-current motor comprises a stator with a plurality of exciter poles and a rotor rotatable relative to the stator about an axis of rotation. The rotor has a plurality of pole teeth and grooves arranged between the pole teeth, which separate the pole teeth from each other along a circumferential direction around the axis of rotation. On the pole teeth coil windings are arranged, which in operation of the brush-commutated direct-current motor are energized via a commutator arranged on the rotor and in this way produce an electromotive force on the rotor by interacting with the exciter poles of the stator. The commutator comprises a plurality of lamellae to which the coil windings of the rotor are connected via connecting arms.

In the manufacture of brush-commutated direct-current motors it can be provided to mount a plurality of coil windings on each pole tooth, in order to thereby reduce the wire thickness required for the manufacture of the coil windings. When merely one coil winding would be arranged on each pole tooth, the same would require a wire of comparatively large wire thickness, which renders processing of the wire for winding around the pole teeth comparatively difficult. By mounting a plurality of coil windings on each pole tooth, the wire thickness of the wire used can be reduced, so that the manufacturing process in general turns out to be easier.

As described in FR 2 841 399 A, a first winding cycle and a second winding cycle, in each of which a coil winding is arranged on each pole tooth, conventionally are carried out in an identical way.

Because the coil windings on the pole teeth are wound in different winding cycles, coil windings which differ in their position however are obtained on each pole tooth. A succeeding coil winding of a later winding cycle now is wound onto a coil winding from a preceding winding cycle, which leads to the fact that the wire length of the outer coil winding wound at a later time is larger and thus in operation parallel branches of coil windings are obtained, which can differ in their electrical resistance—due to the different wire length. This can lead to asymmetries in the commutation current.

In addition, hybrid winding arrangements nowadays are known, in which the coil windings arranged on a pole tooth are not connected with the same lamellae, but are connected to different lamellae. For example, from U.S. Pat. No. 7,821,170 B2 and EP 1 489 724 B1 brush-commutated direct-current motors are known, in which on each pole tooth a first coil winding is mounted in a first winding direction and a second coil winding is mounted in an opposite, second winding direction. Because in such winding arrangements the connecting arms with which the different coil windings of a pole tooth are connected to the respectively associated lamellae possibly intersect, laying of the connecting arms towards the associated lamellae possibly may not be easy to do—in particular with a view to the available installation space.

SUMMARY

It is an object of the present invention to provide a brush-commutated direct-current motor which with good operating behavior can be manufactured in a simple way making use of the available installation space.

This object is solved by a subject-matter with features as described herein.

Accordingly, each pole tooth carries a first coil winding wound around the pole tooth in a first winding direction and a second coil winding wound around the pole tooth in a second winding direction opposite to the first winding direction. The first connecting arm and/or the second connecting arm of the first coil winding here are laid around at least one other pole tooth towards a respectively associated lamella.

The present invention proceeds from the idea to lay a connecting arm of a coil winding not directly from the coil winding wound onto a pole tooth towards the associated lamella, but around one or more pole teeth. In particular in such coil windings in which a connection is not provided to a lamella arranged directly radially within the coil winding, but the associated lamella is offset to the coil winding in circumferential direction, laying of the connecting arm towards the lamella around one or more pole teeth can be advantageous, because in this way intersections of connecting arms of different coil windings can be avoided. Laying of the connecting arms thus can be effected in a favorable way saving installation space.

In a concrete configuration the first winding arm of the first coil winding is laid around exactly one pole tooth adjacent to the associated pole tooth in circumferential direction and the second winding arm of the first coil winding is laid around exactly one pole tooth adjacent to the associated pole tooth against the circumferential direction.

To this end, the first connecting arm of the first coil winding for example can extend through a first groove adjoining the associated pole tooth in circumferential direction, around the pole tooth adjacent to the associated pole tooth in circumferential direction, and through a second groove different from the first groove towards the associated lamella. Analogously, the second connecting arm of the first coil winding then extends through a third groove adjoining the associated pole tooth against the circumferential direction, around the pole tooth adjacent to the associated pole tooth against the circumferential direction, and through a fourth groove different from the third groove towards the associated lamella. The connecting arms of the first coil winding on a pole tooth thus—as seen along the circumferential direction—extend in different directions away from the coil winding and are laid around the pole teeth to the left and right of the pole tooth on which the coil winding is arranged. The connecting arms of the first coil winding thus are not guided directly from the pole tooth towards the associated lamellae, but are laid around the adjacent pole teeth and only then are guided towards the lamellae and connected to the same.

While the connecting arms of the first coil winding thus are laid around other pole teeth, the connecting arms of the second coil winding can be connected to adjacent lamellae which are arranged radially within the second coil winding and thus at least approximately are located at the same circumferential position as the coil winding. The connecting arms of the second coil winding here advantageously are connected to adjacent lamellae and intersect.

While the connecting arms of the second coil winding are connected to adjacent lamellae, the connecting arms of the first coil winding are connected with lamellae which are offset to these adjacent lamellae in circumferential direction. The first connecting arm is connected to a first lamella which is offset to the adjacent lamellae in circumferential direction, while the second connecting arm of the second coil winding is connected to a second lamella which is offset to the adjacent lamellae against the circumferential direction. Between the adjacent lamellae and the first lamella on the one hand and the second lamella on the other hand one or more other lamellae each can be arranged, so that both the first lamella and the second lamella are spaced to the adjacent lamellae by one or more lamellae in circumferential direction.

In a concrete exemplary embodiment the number of pole teeth corresponds to an odd integral number, while the number of lamellae corresponds to twice the number of pole teeth. For example, six exciter poles can be arranged on the stator. The number of pole teeth for example can be 7, 9 or 11, while the number of lamellae correspondingly is 14, 18 or 22.

Preferably, the coil windings are formed as so-called concentrated windings, also referred to as single-tooth windings. This means that the coil windings each are wound around exactly one pole tooth and thus are fabricated by winding a wire around a pole tooth. The coil windings for example can include one, two or three or also more windings and be fabricated of a suitable winding wire.

In one embodiment jumpers are provided, which serve to short individual lamellae of the commutator, in order to thereby reduce the number of the required brush pairs to 1 in the ideal case. When the number of exciter poles is six, for example, each jumper advantageously shorts three lamellae, so that the three lamellae are at the same potential when one of the lamellae is in contact with a brush. The shorted lamellae advantageously have the same angular distance of 120° to each other, corresponding to the equation $$\alpha = 720°/P,$$

wherein P corresponds to the number of exciter poles and is a multiple of 2.

For shorting two lamellae, for example, the jumpers each with at least one portion extend around at least one pole tooth by each extending from a lamella through a groove between two pole teeth, around at least one pole tooth and through another groove to another lamella. This allows to mount the jumpers on the rotor such that they extend through the grooves between the pole teeth and correspondingly are laid in the space in which the coil windings also are arranged on the pole teeth. This on the one hand provides for a reduction of the installation space, because no additional installation space must be provided for the jumpers. The jumpers easily can be laid through the grooves around one or more pole teeth, in order to shortingly connect lamellae with each other. On the other hand it thus becomes possible to fabricate the coil windings and jumpers from an individual winding wire and thus coherent, so that the coil windings and jumpers can be mounted on the rotor in a coherent working step. Separate working steps on the one hand for mounting the coil windings and on the other hand for mounting the jumpers thus can be omitted.

By the fact that a connecting arm or a jumper is laid around at least one pole tooth it is to be understood that the connecting arm or a jumper at least sectionally encloses at least one pole tooth. The connecting arm or the jumper however do not fully surround the pole tooth or teeth, but for example proceeding from a front side of the rotor, on which the lamellae of the commutator are arranged, are inserted into a groove, on a rear side of the rotor extend along one or more pole teeth and are guided through another groove back to the front side of the rotor, in order to be connected with an associated lamella on this front side.

The coil windings and the jumpers advantageously are fabricated from a continuous wire and thus can be mounted on the pole teeth of the rotor in one coherent working step by continuous winding and laying. This results in a simple manufacture which favorably can be automated by use of suitable winding machines. In particular, after mounting the coil windings no more separate working step is required, in order to mount suitable jumpers. Moreover, additional components which conventionally are required for jumpers can be omitted, so that the number of all the required components can be reduced.

When the coil windings and the jumpers are fabricated of a continuous wire, an arrangement in which one portion of a jumper each is arranged between two coil windings preferably is obtained on the rotor. For fabrication a coil winding is mounted on a pole tooth and with one connecting arm each is connected with a lamella, wherein proceeding from a connecting arm a portion of a jumper is laid towards another lamella and this portion of the jumper then is adjoined by a further coil winding.

In one aspect the continuous wire forms a first coil winding, adjoining thereto a portion of a jumper, adjoining thereto a second coil winding and adjoining thereto another portion of a jumper, which in turn is adjoined by a first coil winding. The different coil windings on the pole teeth and the portions of the jumpers thus are produced by a continuous wire and one after the other can be arranged on the pole teeth in successive winding cycles.

For manufacturing the coil windings on the pole teeth of the rotor (at least) one first coil winding in the first winding direction and a second coil winding in the opposite, second winding direction are mounted on each pole tooth. This is effected in different winding cycles, wherein per winding cycle one coil winding is mounted on each pole tooth. Advantageously, in a first winding cycle first coil windings are arranged on a first part of the pole teeth and second coil windings are arranged on a second part of the pole teeth, while in a succeeding, second winding cycle second coil windings are mounted on the first part of the pole teeth and first coil windings are mounted on the second part of the pole teeth. This has the effect that for the first part of the pole teeth the first coil windings are arranged within the second coil windings, because the second coil windings are wound onto the first coil windings, but for the second part of the pole teeth the second coil windings are arranged within the first coil windings, because the first coil windings are wound onto the second coil windings.

Because thus for some pole teeth the first coil windings lie inside and the second coil windings lie outside and for other pole teeth the second coil windings lie inside and the first coil windings lie outside, the wire lengths differ between the first coil windings and the second coil windings not uniformly, but in a different way. In the first part of the pole teeth the wire lengths of the second coil windings, which are wound onto the first coil windings, are longer than the wire lengths of the first coil windings, while for the second part of the pole teeth the wire lengths of the first coil windings are larger than the wire lengths of the second coil windings.

In this way, asymmetries in the resulting electrical branches can at least be reduced in operation of the direct-current motor, so that an at least approximately uniform height is obtained in the commutation current, because parallel branches can have an approximately symmetrical resistance distribution.

BRIEF DESCRIPTION OF THE DRAWINGS

The idea underlying the invention will be explained in detail below with reference to the exemplary embodiments illustrated in the Figures.

FIG. 3A shows a description of a first winding cycle of a winding scheme.

FIG. 3B shows a description of a second winding cycle of the winding scheme.

FIG. 4B shows a schematic representation of the further winding process during the first winding cycle of the winding scheme.

FIG. 4C shows a schematic representation of the winding process, after the first winding cycle of the winding scheme.

FIG. 6 shows a schematic individual representation of two coil windings on two pole teeth.

DETAILED DESCRIPTION

Figure 1:
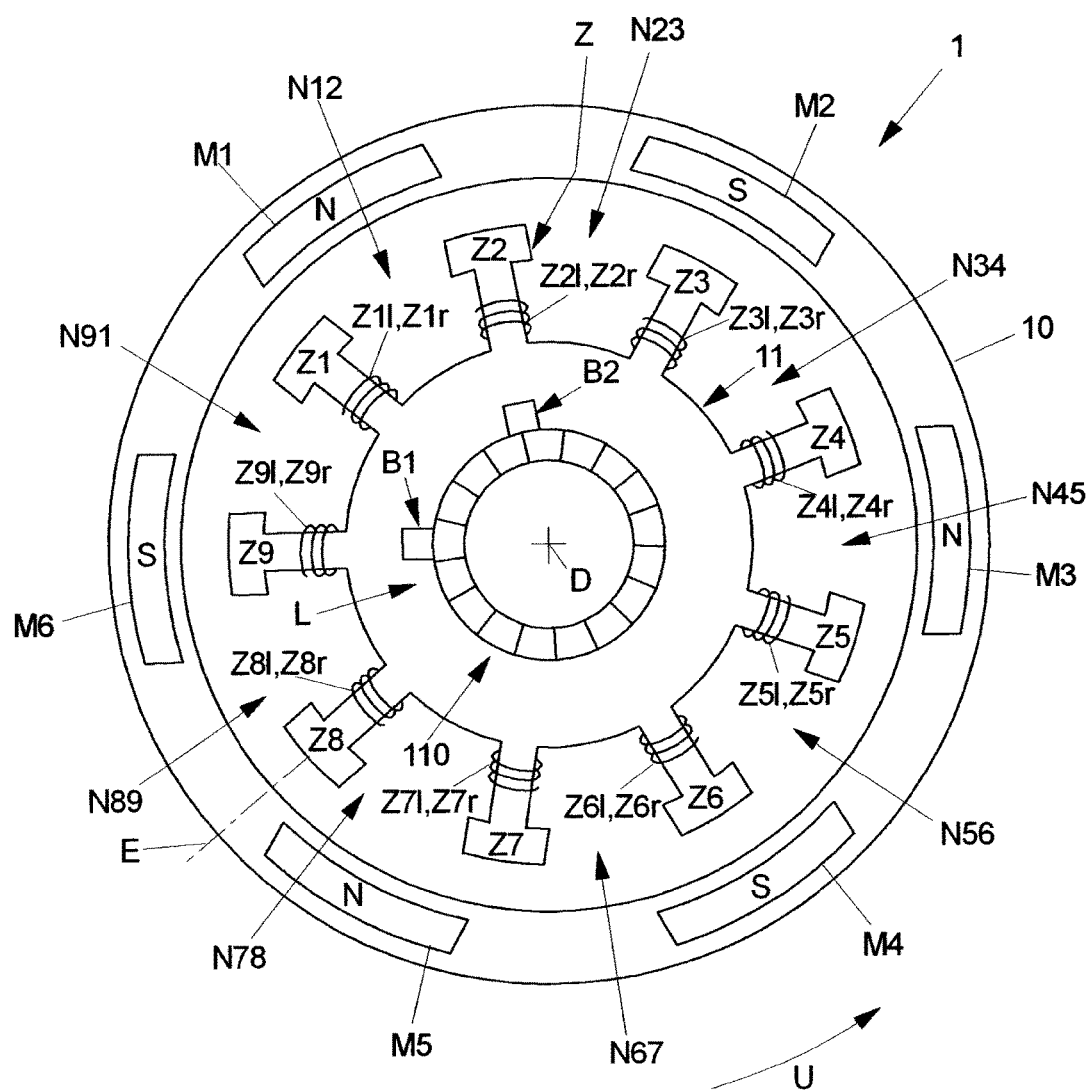
FIG. 1 shows a schematic view of a brush-commutated direct-current motor.

FIG. 1 shows a schematic view of a brush-commutated direct-current motor 1 which includes a stator 10 and a rotor 11 rotatably arranged on the stator 10 about an axis of rotation D.

As is known, the stator 10 includes a number of exciter poles M1-M6 which are formed by permanent magnets and are uniformly distributed around the circumference of the stator 1. The exciter poles M1-M6 point towards the rotor 11 with different, alternating poles N, S such that in circumferential direction U a north pole N always is followed by a south pole S and vice versa.

In the illustrated exemplary embodiment the stator 10 has exactly six exciter poles M1-M6.

The rotor 11 is rotatably arranged on the stator 10 about the axis of rotation D and, in the illustrated exemplary embodiment, has nine pole teeth Z1-Z9, which are extended along a direction of extension E radially to the axis of rotation D, point towards the stator 10 and are separated from each other by grooves N12, N23, N34, N45, N56, N67, N78, N89, N91 in circumferential direction around the axis of rotation D. The rotor 11 for example in a manner known per se can be designed as sheet pack of individual rotor sheets, in which the pole teeth Z1-Z9 are integrally molded.

In the illustrated exemplary embodiment the rotor 11 has exactly nine pole teeth Z1-Z9. Each pole tooth Z1-Z9 carries coil windings Z1l-Z9l, Z1r-Z9r in the form of concentrated windings which each are wound around a pole tooth Z1-Z9. The coil windings Z1l-Z9l, Z1r-Z9r each are connected with lamellae L of a commutator 110 which is firmly arranged on the rotor 11 and slidingly is operatively connected with brushes B1, B2 which are stationarily arranged on the stator 10 such that via the brushes B1, B2 and the commutator 110 the coil windings Z1l-Z9l, Z1r-Z9r can be energized to produce an electromotive force (EMF). Via the commutator 110 a commutation of the current flowing in the coil windings Z1l-Z9l, Z1r-Z9r is effected.

Figure 2:
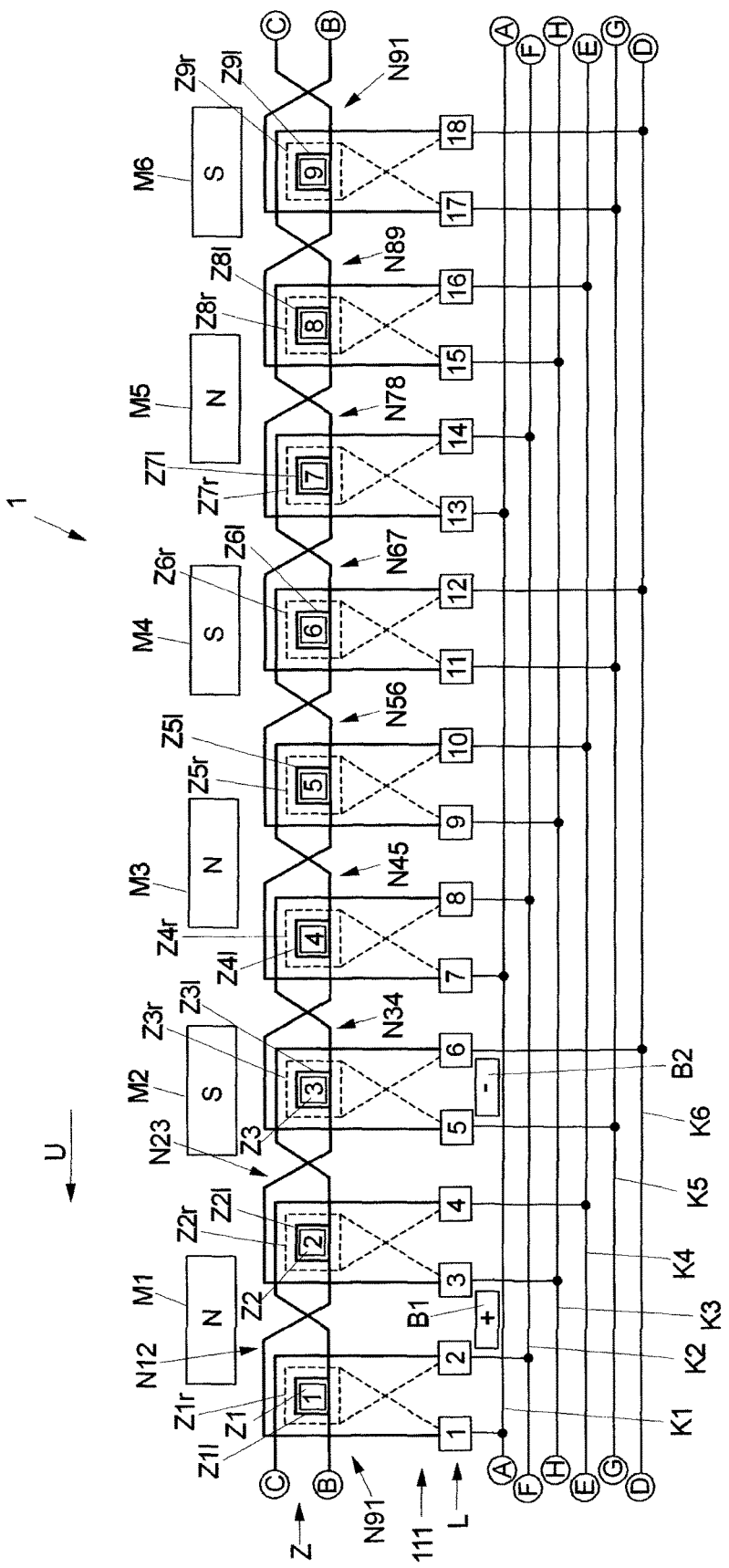
FIG. 2 shows a schematic, unwound representation of a brush-commutated direct-current motor.

FIG. 2 shows a schematic view of the brush-commutated direct-current motor 1, wherein for a simplified overview the brush-commutated direct-current motor 1 is shown in an unwound way and correspondingly the exciter poles M1-M6 and the pole teeth Z1-Z9 as well as the commutator 110 with its individual lamellae L1-L18 are not arranged along a circle, but along a straight line.

In the illustrated exemplary embodiment the commutator 110 includes eighteen lamellae L1-L18.

As shown in FIG. 2, two coil windings Z1l-Z9l, Z1r-Z9r are arranged on each pole tooth Z1-Z9. The coil windings Z1l-Z9l, Z1r-Z9r arranged on a pole tooth Z1-Z9 here are wound onto the associated pole tooth Z1-Z9 in different winding directions. Each pole tooth Z1-Z9 correspondingly carries a first coil winding Z1l-Z9l wound in a first winding direction (also referred to as left-wound coil winding) and a second coil winding Z1r-Z9r wound in an opposite, second winding direction (referred to as right-wound coil winding).

At its connecting arms Zl1, Zl2, Zr1, Zr2 each coil winding Z1l-Z9l, Z1r-Z9r is connected with exactly two lamellae L1-L18 of the commutator 110 of the rotor 11. For example, the right-wound coil winding Z1r of the first pole tooth Z1 is connected with the lamella L1 via a first connecting arm Zr1 and with the lamella L2 adjacent to the lamella L1 via a second connecting arm Zr2, while the left-wound coil winding Z1l of the first pole tooth Z1 is connected with the lamella L17 via a first connecting arm Zl1 and with the lamella L4 via a second connecting arm Zl2. While the right-wound coil winding Z1r thus is connected with adjacent lamellae L1, L2, the left-wound coil winding Z1l is connected with lamellae L17, L4 spaced from each other in circumferential direction U around the axis of rotation D and arranged on both sides of the pair of lamellae L1, L2 connected with the right-wound coil winding Z1r.

Analogously, the remaining coil windings Z2l-Z9l, Z2r-Z9r also are connected with lamellae L1-L18.

The energization of the coil windings Z1l-Z9l, Z1r-Z9r in operation of the direct-current motor 1 is effected via the brushes B1, B2, wherein in the illustrated exemplary embodiment exactly two brushes B1, B2 are provided. To ensure that lamellae L1-L18 offset to each other by 120° are at the same potential and to be able to omit additional brushes, jumpers K1-K6 are provided, which each short three lamellae L1-L18 offset to each other by 120° in circumferential direction around the axis of rotation D and thus ensure that upon contact of one of the three lamellae L1-L18 with one of the brushes B1, B2 the correspondingly shorted lamellae L1-L18 are at the same potential.

In the illustrated exemplary embodiment, as can be taken from the schematic view of FIG. 2, the following lamellae are shorted with each other:

L1-L7-L13 (jumper K1),
L2-L8-L14 (jumper K2),
L3-L9-L15 (jumper K3),
L4-L10-L16 (jumper K4),
L5-L11-L17 (jumper K5),
L6-L12-L18 (jumper K6).

Figure 5:
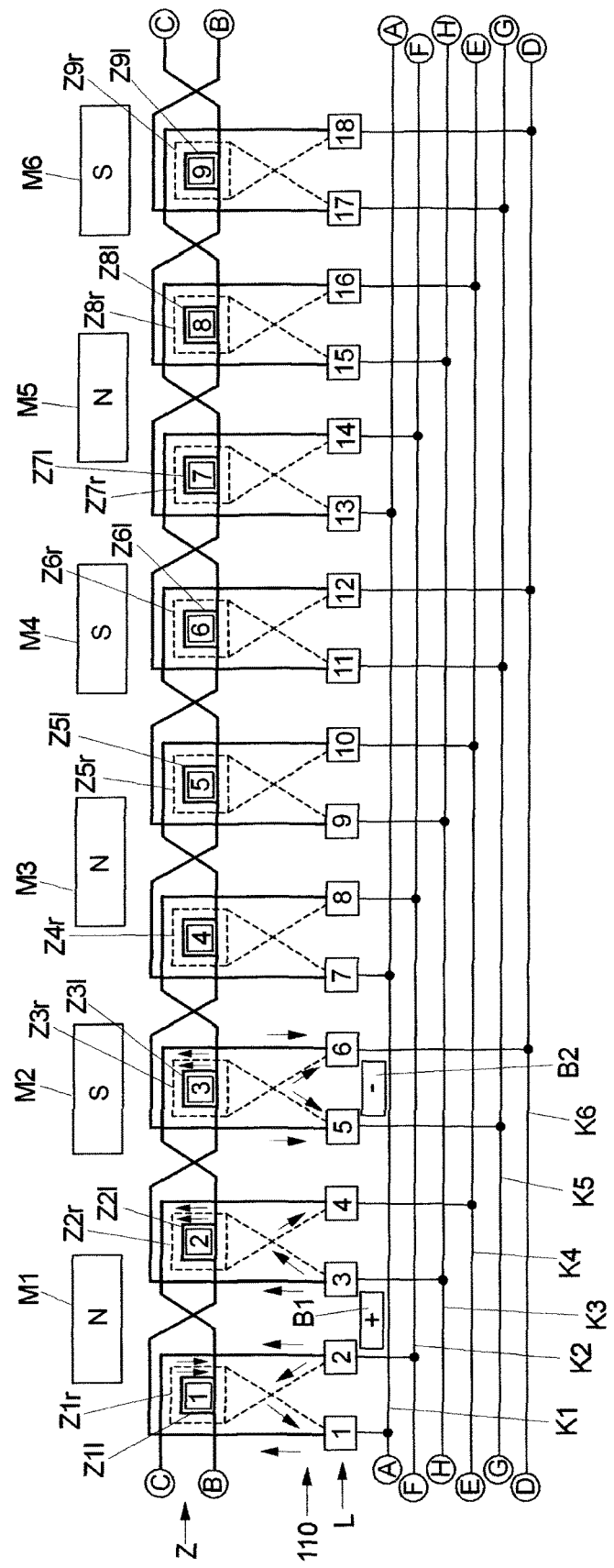
FIG. 5 shows a schematic representation of the winding scheme, with marked current flows.

When in the rotor position as shown in FIG. 5 the brush B1 for example rests against the lamellae L2, L3 and the brush B2 rests against the lamellae L5, L6 and when the brush B1 has a positive polarity (+) and the brush B2 has a negative polarity (−), the current flow directions indicated by arrows in FIG. 5 are obtained at the connecting arms Zl1, Zl2, Zr1, Zr2 of the coil windings Z1*l*, Z1*r*, Z2*l*, Z2*r*, Z3*l*, Z3*r*.

In the exemplary embodiment shown in FIG. 2 the connecting arms Zr1, Zr2 of the second, right-wound coil winding Z1*r*-Z9*r* with adjacent lamellae L1-L18 are arranged directly radially within the associated pole tooth Z1-Z9, wherein the connecting arms Zr1, Zr2 intersect, as can be taken from FIG. 2. The first, left-wound coil windings Z1*l*-Z9*l* with their connecting arms Zl1, Zl2 on the other hand are connected with lamellae L1-L18 which are arranged on both sides of the pair of lamellae L1, L2. For the first coil winding Z1*l* and the second coil winding Z1*r* on the first pole tooth Z1 the first coil winding Z1*l* for example is connected with the lamellae L17, L4, while the second coil winding Z1*r* is connected with the lamellae L1, L2. The pair of lamellae L1, L2 connected with the second coil winding Z1*r*—as seen along the circumferential direction U—thus is arranged between the lamellae L17, L4, to which the first coil winding Z1*l* is connected, wherein the lamellae L17, L4 to which the first coil winding Z1*l* is connected each are spaced from the pair of lamellae L1, L2, to which the second coil winding Z1*r* is connected, by exactly one lamella L18, L3.

While the connecting arms Zr1, Zr2 of the second coil winding Z1*r*-Z9*r* here are laid directly to the associated, adjacent lamellae L1-L18, the connecting arms Zl1, Zl2 of the first coil winding Z1*l*-Z9*l* each extend around a pole tooth Z1-Z9, which is adjacent to the pole tooth Z1-Z9 on which the coil winding Z1*l*-Z9*l* is arranged. This results in the laying as shown in FIG. 2, in which for the first coil winding Z1*l* of the first pole tooth Z1 the first connecting arm Zl1 extends around the ninth pole tooth Z9 adjacent to the first pole tooth Z1 and for this purpose is laid through the groove N91 between the first pole tooth Z1 and the ninth pole tooth Z9, around the ninth pole tooth Z9 and through the groove N89 between the ninth pole tooth Z9 and the eighth pole tooth Z8 towards the associated lamella L17. The second connecting arm Zl2 of the first coil winding Z1*l* of the first pole tooth Z1 on the other hand extends around the second pole tooth Z2 adjacent to the first pole tooth Z1 against the circumferential direction U and for this purpose is laid through the groove N12 between the first pole tooth Z1 and the second pole tooth Z2, around the second pole tooth Z2 and through the groove N23 between the second pole tooth Z2 and the third pole tooth Z3 towards the associated lamella L4.

Analogously, the connecting arms Zl1, Zl2 of the other first coil windings Z2*l*-Z9*l* also are laid on the other pole teeth Z2-Z9, as can be taken from FIG. 2.

Figures 3A, 3B:
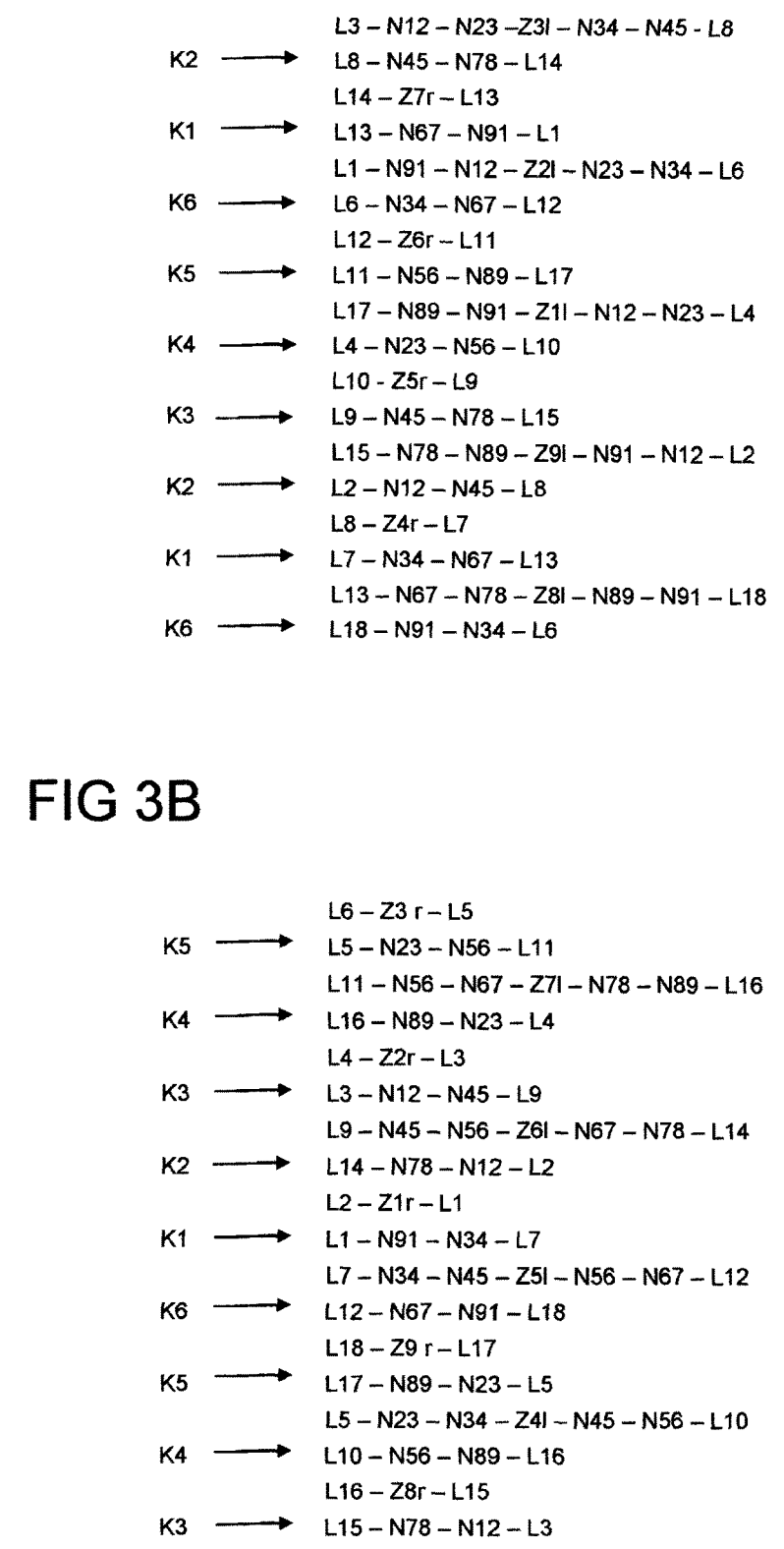

FIGS. 3A, 3B in a synopsis with FIGS. 4A-4E illustrate the winding process for mounting the coil windings Z1*l*-Z9*l*, Z1*r*-Z9*r* on the pole teeth Z1-Z9. The coil windings Z1*l*-Z9*l*, Z1*r*-Z9*r* here are wound together with the jumpers K1-K6 by using a continuous wire in two succeeding winding cycles, wherein per winding cycle one coil winding Z1*l*-Z9*l*, Z1*r*-Z9*r* is mounted on each pole tooth Z1-Z9.

Figure 4A:
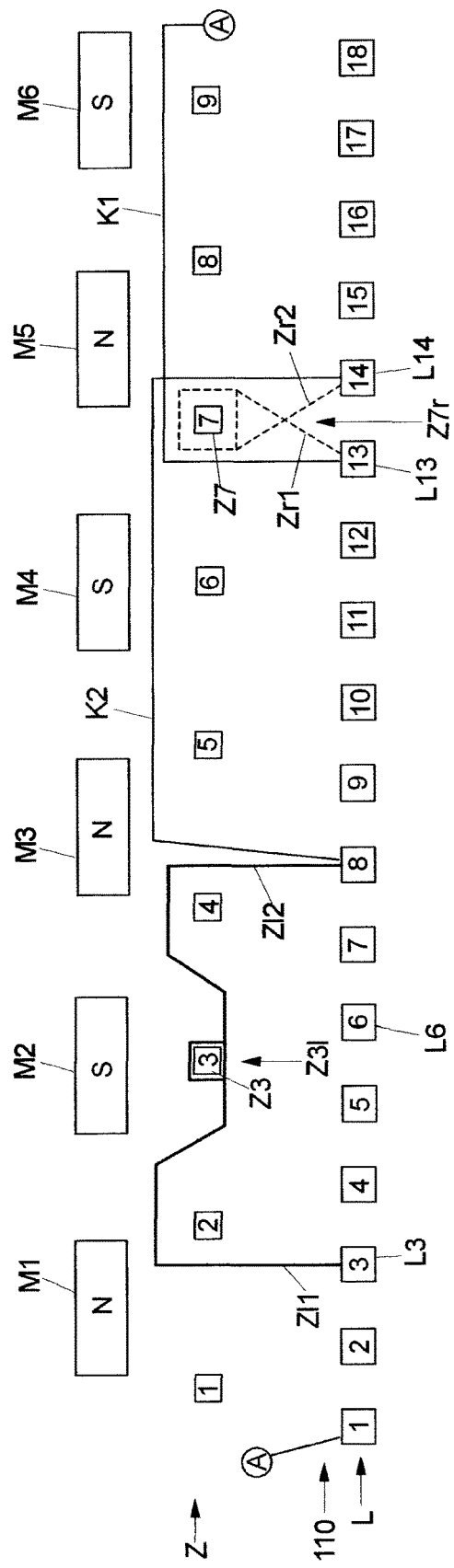
FIG. 4A shows a schematic representation of the winding process at the beginning of the first winding cycle of the winding scheme.

Corresponding to the first line in FIG. 3A, the winding process starts at the lamella L3. The steps of the winding process according to the first four lines in FIG. 3A are illustrated in FIG. 4A.

Proceeding from the lamella L3 the first connecting arm Zl1 of the first coil winding Z3*l* of the third pole tooth Z3 initially is laid through the groove N12, around the second pole tooth Z2 and through the groove N23 towards the third pole tooth Z3, in order to wind the first coil winding Z3*l* on the third pole tooth Z3. Then, the second connecting arm Zl2 of the first coil winding Z3*l* of the third pole tooth Z3 is laid through the groove N34, around the fourth pole tooth Z4 and through the groove N45 towards the lamella L8 and connected to the same (first line according to FIG. 3A).

Proceeding from the lamella L8 a portion of the jumper K2 between the lamella L8 and the lamella L14 then is laid, wherein this portion is laid around the pole teeth Z5, Z6, Z7 (second line according to FIG. 3A).

Proceeding from the lamella L14 the second coil winding Z7*r* then is wound onto the seventh pole tooth Z7, wherein the winding direction of this second coil winding Z7*r* differs from the first coil winding Z3*l* of the third pole tooth Z3. The second coil winding Z7*r* of the seventh pole tooth Z7 then is connected with the lamella L13, wherein the connecting arms Zr1, Zr2 of this coil winding Z7*r* intersect (third line according to FIG. 3A).

Proceeding from the lamella L13 a portion of the jumper K1 between the lamella L13 and the lamella L1 then is laid, wherein this portion of the jumper K1 extends around the pole teeth Z7, Z8, Z9 (fourth line according to FIG. 3A).

FIG. 4B illustrates the next four lines according to FIG. 3A. First of all, the first coil winding Z2*l* is wound onto the second pole tooth Z2 (fifth line according to FIG. 3A), then a portion of the jumper K6 between the lamellae L6, L12 is laid (sixth line according to FIG. 3A), the second coil winding Z6*r* is wound onto the sixth pole tooth Z6 (seventh line according to FIG. 3A), and finally a portion of the jumper K5 between the lamellae L11, L17 is laid (eighth line according to FIG. 3A).

At the end of the first winding cycle, as it is described in FIG. 3A, the coil arrangement according to FIG. 4C is obtained. For a simplified representation, FIG. 4C (and likewise FIGS. 4D and 4E) shows the jumpers K1-K6 with their portions not in their laying extended around the pole teeth Z1-Z9, but schematically shows the same outside the pole teeth Z1-Z9 under the lamellae L1-L18.

After the end of the first winding cycle exactly one coil winding is arranged on each pole tooth Z1-Z9, wherein on some pole teeth Z1-Z3, Z8, Z9 first coil windings Z1*l*-Z3*l*, Z8*l*, Z9*l* are arranged, and on other pole teeth Z4-Z7 second coil windings Z4*r*-Z7*r* are arranged. In addition, the jumpers K1-K6 sectionally, but not completely are manufactured after the end of the first winding cycle.

Figure 4D:
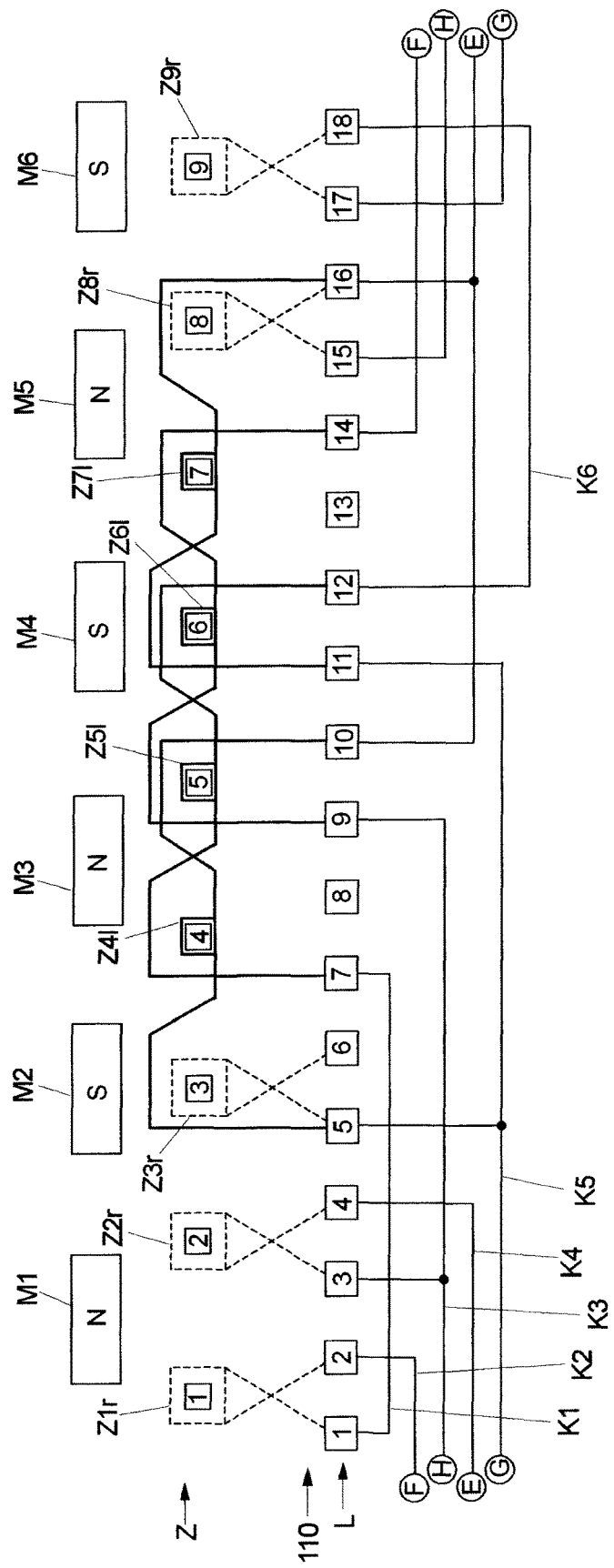
FIG. 4D shows a schematic representation of the second winding cycle of the winding process.

Then follows the second winding cycle described in FIG. 3B, in which the coil windings and portions of the jumpers K1-K6 as shown in FIG. 4D are manufactured. In the second winding cycle especially those coil windings and portions of the jumpers K1-K6 are manufactured which have not been manufactured in the first winding cycle. In the second winding cycle first coil windings Z1*r*-Z3*r*, Z8*r*, Z9*r* are mounted on the pole teeth Z1-Z3, Z8, Z9 and first coil windings Z4*l*-Z7*l* are mounted on the pole teeth Z4-Z7. The portions of the jumpers K1-K6 missing after the first winding cycle are supplemented.

Figure 4E:
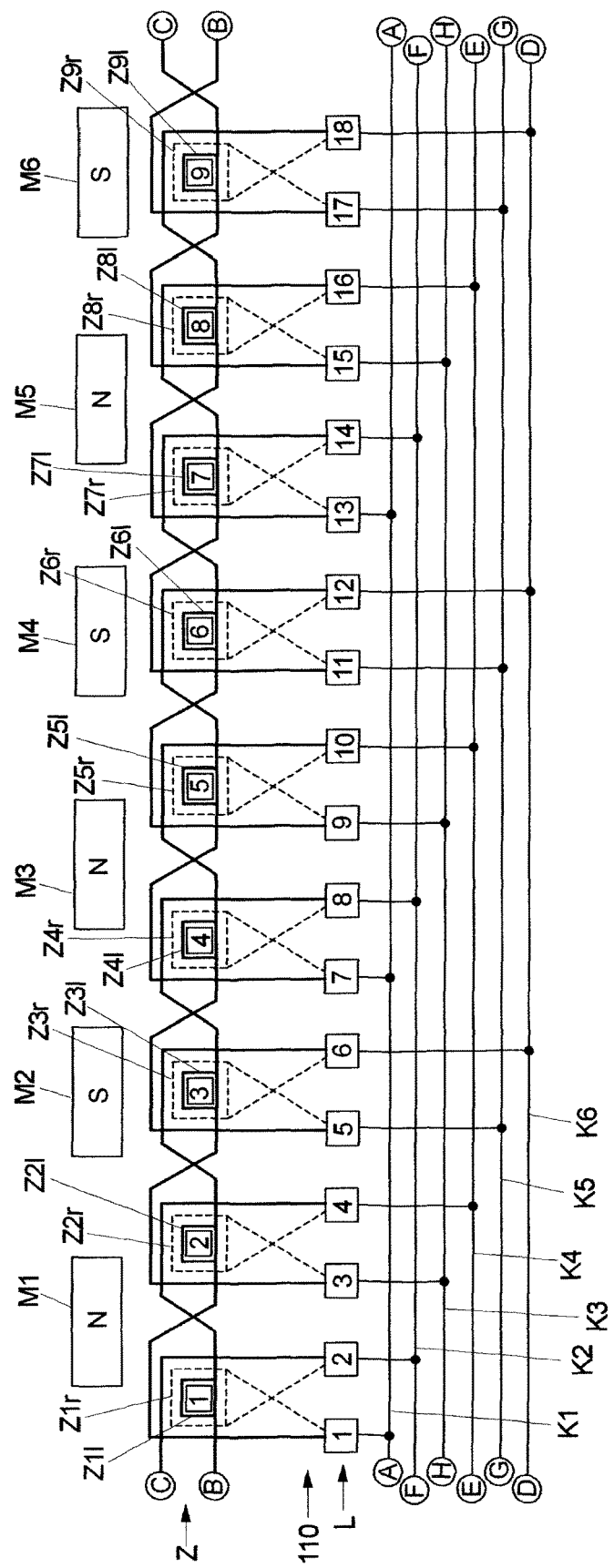
FIG. 4E shows a schematic representation of the winding process, after completion of the second winding cycle.

After the end of both winding cycles the arrangement shown in FIG. 4E is obtained, in which on each pole tooth Z1-Z9 exactly one first coil winding Z1*l*-Z9*l* of a first winding direction (left-wound) and a second coil winding Z1*r*-Z9*r* of a second winding direction (right-wound) are arranged and the jumpers K1-K6 for shorting three lamellae L1-L18 each are completed.

For a simplified representation the first coil windings Z1*l*-Z9*l* and the second coil windings Z1*r*-Z9*r* are shown uniformly. Because in the first winding cycle the first coil windings Z1*l*-Z3*l*, Z8*l*, Z9*l* have been mounted on the pole teeth Z1-Z3, Z8, Z9 and the second coil windings Z4*r*-Z7*r* have been mounted on the pole teeth Z4-Z7, the same however lie on the inside, while in the second winding cycle the first coil windings Z4*l*-Z7*l* and the second coil windings Z1*r*-Z3*r*-Z8*r*, Z9*r* are wound onto the coil windings mounted already on the respective pole tooth Z1-Z9 and thus lie radially on the outside—with respect to the direction of extension E of each pole tooth Z1-Z9.

Because the connecting arms Zl1, Zl2 of the first coil windings Z1*l*-Z9*l* are laid around pole teeth Z1-Z9 which are spaced from the pole tooth Z1-Z9 each carrying the coil winding Z1*l*-Z9*l*, an advantageous laying of the connecting arms Zl1, Zl2 of the first coil windings Z1*l*-Z9*l* is obtained. In particular, intersections of these connecting arms Zl1, Zl2 with the connecting arms Zr1, Zr2 of the second coil windings Z1*r*-Z9*r* are avoided, as is clearly shown in FIG. 4E and can be taken from the enlarged representation of FIG. 6.

The fact that in the different winding cycles first coil windings Z1*l*-Z9*l* are mounted on some pole teeth and second coil windings Z1*r*-Z9*r* are mounted on other pole teeth Z1-Z9 results in that for some pole teeth Z1-Z9 the first coil windings Z1*l*-Z9*l* and for the other pole teeth Z1-Z9 the second coil windings Z1*r*-Z9*r* lie on the inside. This results in the fact that for some pole teeth Z1-Z9 the wire lengths of the first coil windings Z1*l*-Z9*l* and for other pole teeth Z1-Z9 the wire lengths of the second coil windings Z1*r*-Z9*r* are longer. In operation of the direct-current motor parallel branches with at least approximately symmetrical resistance distributions are obtained, which leads to a more uniform commutation current.

In principle, the first winding cycle and the second winding cycle can be wound from a single continuous wire. However, it also is conceivable and possible to manufacture the first winding cycle from a first continuous wire and the second winding cycle from a second continuous wire or even use individual wires for individual winding steps per winding cycle.

The idea underlying the invention is not limited to the exemplary embodiments described above, but in principle can also be realized in completely different embodiments.

In particular, the brush-commutated direct-current motor in principle also can include other numbers of pole teeth and lamellae. In general, the number of pole teeth can correspond to an odd number, with the number of lamellae corresponding to twice the number of pole teeth. For example, the number of pole teeth also can be seven or eleven, and the number of lamellae correspondingly can be 14 or 22.

In principle it also is conceivable to omit jumpers. In this case, for example, three brush pairs with a total of six brushes can be used, which effect a parallel energization of the coil windings.

LIST OF REFERENCE NUMERALS

1 brush-commutated direct-current motor
10 stator
11 rotor
110 commutator
B1, B2 brush
D axis of rotation
K1-K6 jumper
L, L1-L8 lamella
M1-M6 exciter pole
N north pole
N12-N91 groove
S south pole
U circumferential direction
Z1*l*-Z9*l*, Z1*r*-Z9*r* concentrated coil winding
Zl1, Zl2, Zr1, Zr2 connecting arm
Z, Z1-Z9 pole tooth

The invention claimed is:

1. A brush-commutated direct-current motor, comprising
a stator which has a plurality of exciter poles,
a rotor rotatable relative to the stator about an axis of rotation,
a plurality of pole teeth arranged on the rotor,
grooves arranged between the pole teeth, wherein the pole teeth are separated from each other by the grooves along a circumferential direction around the axis of rotation,
coil windings arranged on the pole teeth, and
a commutator which is arranged on the rotor and includes a plurality of lamellae, wherein each coil winding is connected with one of the lamellae via a first connecting arm and is connected with another one of the lamellae via a second connecting arm,
wherein each pole tooth carries a first coil winding wound around the pole tooth in a first winding direction and a second coil winding wound around the pole tooth in a second winding direction opposite to the first winding direction, wherein the first connecting arm and/or the second connecting arm of the first coil winding is laid around at least one other pole tooth towards a respectively associated lamella.

2. The brush-commutated direct-current motor according to claim 1, wherein the first winding arm of the first coil winding is laid around exactly one pole tooth adjacent to the associated pole tooth in circumferential direction and the second winding arm of the first coil winding is laid around exactly one pole tooth adjacent to the associated pole tooth against the circumferential direction.

3. The brush-commutated direct-current motor according to claim 1, wherein the first connecting arm of the first coil winding extends through a first groove adjacent to the associated pole tooth in the circumferential direction, around a pole tooth adjacent to the associated pole tooth in the circumferential direction, and through a second groove different from the first groove towards an associated first lamella.

4. The brush-commutated direct-current motor according to claim 1, wherein the second connecting arm of the first coil winding extends through a third groove adjacent to the associated pole tooth against the circumferential direction, around a pole tooth adjacent to the associated pole tooth against the circumferential direction, and through a fourth groove different from the third groove towards an associated second lamella.

5. The brush-commutated direct-current motor according to claim 1, wherein the first connecting arm and the second connecting arm of the second coil winding are connected to adjacent lamellae.

6. The brush-commutated direct-current motor according to claim 5, wherein the first connecting arm of the first coil winding is connected to a first lamella which in circumferential direction is offset to the adjacent lamellae to which the connecting arms of the second coil winding are connected.

7. The brush-commutated direct-current motor according to claim 5, wherein the second connecting arm of the first coil winding is connected to a second lamella which against the circumferential direction is offset to the adjacent lamellae to which the connecting arms of the second coil winding are connected.

8. The brush-commutated direct-current motor according to claim 1, wherein the first connecting arm and the second connecting arm of the second coil winding intersect.

9. The brush-commutated direct-current motor according to claim 1, wherein the number of pole teeth corresponds to an odd, integral number and the number of lamellae corresponds to twice the number of pole teeth.

10. The brush commutated direct-current motor according to claim 1, wherein the number of exciter poles is six and
the number of pole teeth is nine and the number of lamellae is 18, or
the number of pole teeth is seven and the number of lamellae is 14, or
the number of pole teeth is eleven and the number of lamellae is 22.

11. The brush-commutated direct-current motor according to claim 1, that wherein the coil windings are formed as concentrated windings.

12. The brush-commutated direct-current motor according to claim 1, further comprising jumpers for shorting two or more lamellae.

13. The brush-commutated direct-current motor according to claim 12, wherein the jumpers for shorting two lamellae with at least one portion each are laid around at least one pole tooth by each extending from a lamella through a groove between two pole teeth, around at least one pole tooth and through another groove to another lamella.

14. The brush-commutated direct-current motor according to claim 12, wherein the jumpers each short exactly three lamellae.

15. The brush-commutated direct-current motor according to claim 12, wherein the coil windings and the jumpers are formed of a continuous wire.

16. The brush-commutated direct-current motor according to claim 15, wherein between two coil windings a portion of a jumper each is formed.

17. The brush-commutated direct-current motor according to claim 15, wherein the continuous wire forms a first coil winding, adjoining thereto a portion of a jumper, adjoining thereto a second coil winding and adjoining thereto another portion of a jumper.

18. The brush-commutated direct-current motor according to claim 1, wherein
for a first part of the pole teeth the first coil winding is wound onto the respectively associated pole tooth and the second coil winding circumferentially is wound onto the first coil winding and
for a second part of the pole teeth the second coil winding is wound onto the respectively associated pole tooth and the first coil winding circumferentially is wound onto the second coil winding.

* * * * *